United States Patent [19]
Flick

[11] Patent Number: 5,739,748
[45] Date of Patent: Apr. 14, 1998

[54] METHOD AND APPARATUS FOR REMOTELY ALERTING A VEHICLE USER OF A SECURITY BREACH

[76] Inventor: Kenneth E. Flick, 5236 Presley Pl., Douglasville, Ga. 30135

[21] Appl. No.: 681,581

[22] Filed: Jul. 29, 1996

[51] Int. Cl.⁶ .................................................. B60R 25/10
[52] U.S. Cl. ............... 340/426; 340/825.36; 340/825.69; 455/63
[58] Field of Search ................................. 340/426, 425.5, 340/429, 539, 541, 825.44, 825.69, 825.72, 825.36; 455/54.2, 127, 343, 63; 367/197, 199; 307/10.3, 10.5; 180/287

[56] References Cited

U.S. PATENT DOCUMENTS

| | | | |
|---|---|---|---|
| 4,012,728 | 3/1977 | Fowler | 340/224 |
| 4,141,009 | 2/1979 | Fowler | 340/539 |
| 4,665,379 | 5/1987 | Howell et al. | 340/63 |
| 4,905,271 | 2/1990 | Namekawa | 379/58 |
| 4,924,206 | 5/1990 | Ayers | 340/426 |
| 4,947,151 | 8/1990 | Rosenberger | 340/426 |
| 4,973,958 | 11/1990 | Hirano et al. | 340/825.69 |
| 4,983,948 | 1/1991 | Synami | 340/426 |
| 5,027,104 | 6/1991 | Reid | 340/541 |
| 5,148,159 | 9/1992 | Clark et al. | 340/825.69 |
| 5,216,407 | 6/1993 | Hwang | 340/426 |
| 5,276,728 | 1/1994 | Pagliaroli et al. | 379/58 |
| 5,291,193 | 3/1994 | Isobe et al. | 340/825.69 |
| 5,315,285 | 5/1994 | Nykerk | 340/426 |
| 5,335,264 | 8/1994 | Namekawa | 379/58 |
| 5,382,948 | 1/1995 | Richmond | 340/825.36 |
| 5,432,495 | 7/1995 | Tompkins | 340/429 |
| 5,437,060 | 7/1995 | Delameter et al. | 455/63 |
| 5,448,218 | 9/1995 | Espinosa | 340/426 |
| 5,448,754 | 9/1995 | Ho et al. | 455/63 |

OTHER PUBLICATIONS

*Telecommunications: Point–to–Point and Mobile Systems,* "Land–Mobile Radio Communications Network," pp. 22–18 & 22–19.

*Primary Examiner*—Jeffery Hofsass
*Assistant Examiner*—John Tweel, Jr.
*Attorney, Agent, or Firm*—Allen, Dyer, Doppelt, Milbrath & Gilchrist, P.A.

[57] ABSTRACT

A method of using a common carrier paging receiver carried by a vehicle user to alert the user of a vehicle security breach includes the steps of: providing a vehicle alarm transmitter at the vehicle for transmitting a vehicle security alarm signal compatible with common carrier paging signals; sensing for a breach of vehicle security using at least one vehicle security sensor; and transmitting the vehicle security alarm signal from the vehicle alarm transmitter responsive to a sensed breach of vehicle security. The method preferably further comprises the steps of: directly receiving the vehicle security alarm signal at the common carrier paging receiver from the vehicle alarm transmitter without using other portions of the common carrier paging network; and indicating a vehicle security breach to the vehicle user via the common carrier paging receiver responsive to receipt of the vehicle security alarm signal. Accordingly, the vehicle user can receive both common carrier paging signals and the vehicle security alarm signal using the common carrier paging receiver. In addition, the vehicle alarm security signal is transmitted and received without using any portion of the common carrier network, so that no common carrier resources are used or charges incurred. Apparatus aspects of the invention are also disclosed.

41 Claims, 3 Drawing Sheets

METHOD AND APPARATUS FOR REMOTELY ALERTING A VEHICLE USER OF A SECURITY BREACH

FIELD OF THE INVENTION

The present invention relates to the field of security systems and related methods, and more particularly, to a vehicle security system and method.

BACKGROUND OF THE INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or movement within the vehicle. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A number of patents disclose radio transmitters in a vehicle security system for alerting a user away from the vehicle via a dedicated receiver carried by the vehicle owner. For example, U.S. Pat. No. 4,924,206 to Ayers discloses such a conventional system. Along these lines, U.S. Pat. No. 5,027,104 to Reid discloses a vehicle security system including vehicle mounted cameras that may alert the vehicle owner via a dedicated receiver, and while also sending a video signal to a second receiver location. U.S. Pat. No. 5,216,407 to Hwang discloses a vehicle security system including a paging system for providing an output to send a warning signal to the vehicle owner's pager or portable phone.

U.S. Pat. No. 4,665,379 to Howell et al. discloses a generic conventional paging transmitter for sending an alarm signal to the wearer of a suitable paging receiver. U.S. Pat. No. 5,276,728 to Pagliaroli et al. discloses a vehicle security system wherein the user carries a portable receiver, and can disable the vehicle by dialing an appropriate code via a cellular telephone.

U.S. Pat. No. 5,315,285 discloses a similar vehicle security system and provides that a more sophisticated remote receiver may be connected to a telephone circuit and provide the capability of automatically dialing a prescribed sequence of telephone numbers in order to alert at least one remote location of a sensed alarm condition. Similarly, U.S. Pat. No. 5,335,264 to Namekawa discloses a vehicle security system including a handheld unit which, in turn, includes a transmitter and receiver. The remote receiver can receive an alarm signal from the vehicle, and a cellular telephone within the vehicle can be used to collect sounds from within the vehicle. The Namekawa patent, U.S. Pat. No. 4,905,271, also discloses a vehicle security system wherein the cellular telephone is turned on responsive to an alarm and which enables the driver to determine the state of the security system by calling the mobile telephone system before running to the car.

Unfortunately, for many security systems as described above, a separate and dedicated receiver is typically needed to be carried by the vehicle owner or user for receiving a remote alarm signal from a vehicle security system. For those more complicated systems employing a cellular telephone in the vehicle, such as to monitor the vehicle interior sounds during a breach of security, common carrier cellular telephone resources are used and charges thereby incurred from operation of the vehicle security system.

SUMMARY OF THE INVENTION

In view of the foregoing background, it is therefore an object of the present invention to provide a method and associated apparatus for alerting a vehicle user of a breach of vehicle security without requiring a separate dedicated receiver to be carried by the user.

It is another object of the present invention to provide a method and associated apparatus which does not use cellular telephone or other common carrier resources when alerting a vehicle user to a breach of vehicle security.

These and other objects, advantages and features according to the present invention are provided by a method of using a common carrier paging receiver carried by a vehicle user to alert the user of a vehicle security breach. The common carrier paging receiver preferably is capable of receiving common carrier paging signals from a common carrier paging network. The method preferably comprises the steps of: providing a vehicle alarm transmitter at the vehicle for transmitting a vehicle security alarm signal compatible with common carrier paging signals; sensing for a breach of vehicle security using at least one vehicle security sensor; and transmitting the vehicle security alarm signal from the vehicle alarm transmitter responsive to a sensed breach of vehicle security.

The method preferably further comprises the steps of: directly receiving the vehicle security alarm signal at the common carrier paging receiver from the vehicle alarm transmitter without using other portions of the common carrier paging network; and indicating a vehicle security breach to the vehicle user via the common carrier paging receiver responsive to receipt of the vehicle security alarm signal. Accordingly, the vehicle user can receive both common carrier paging signals and the vehicle security alarm signal using the common carrier paging receiver. In addition, the vehicle alarm security signal is transmitted and received without using any portion of the common carrier network, so that no common carrier resources are used or charges incurred.

The common carrier paging receiver is preferably responsive to a pager identification code. Accordingly, the step of transmitting the vehicle security alarm signal preferably comprises transmitting the alarm signal and including the pager identification code.

The step of transmitting the vehicle security alarm signal preferably comprises transmitting the alarm signal at a relatively low power so as to reduce a likelihood of interference with other nearby portions of the common carrier paging network, while being sufficient to cooperate with the common carrier paging receiver to alert the owner or user of a security breach. Since a vehicle security alarm signal is of little value unless the owner is nearby, the transmitter of the present invention need have only a relatively limited range in cooperation with the paging receiver. In addition, the common carrier paging receiver preferably operates at a predetermined frequency allocated for common carrier usage, and the step of transmitting the vehicle security alarm signal comprises transmitting the alarm signal at the predetermined frequency of the common carrier paging receiver.

The method may also include the step of selecting a common carrier paging format for the vehicle alarm transmitter from among a plurality of such formats as may be used by different manufacturers, for example. Accordingly, compatibility with many different manufacturers or systems is provided.

The step of transmitting the vehicle security alarm signal preferably includes transmitting the signal so as to generate a message at the common carrier paging receiver of a breach of vehicle security. For example, the message may be an alphanumeric message relating to the specific security breach or sensor activated.

An apparatus aspect of the present invention is for alerting a vehicle user of a vehicle security breach. The apparatus preferably comprises: at least one vehicle security sensor for sensing a breach of vehicle security; a vehicle alarm transmitter at the vehicle for transmitting a vehicle security alarm signal compatible with common carrier paging signals responsive to a sensed breach of vehicle security; and a common carrier pager for being carried by the vehicle user when away from the vehicle. The common carrier pager preferably comprises receiver means for receiving common carrier paging signals from a common carrier paging network and for directly receiving the vehicle security alarm signal from the vehicle alarm transmitter without using other portions of the common carrier paging network. The pager also preferably includes indicating means for indicating receipt of the vehicle security alarm signal to the vehicle user to thereby alert the vehicle user of the vehicle security breach.

The common carrier pager may comprise code receive means for activating the indicating means responsive to receipt of a pager identification code. The transmitter preferably comprises code transmit means for transmitting the vehicle security alarm signal including the pager identification code. The pager identification code and other selectable parameters, for example, may be selected by learning or programming the code into the transmitter.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
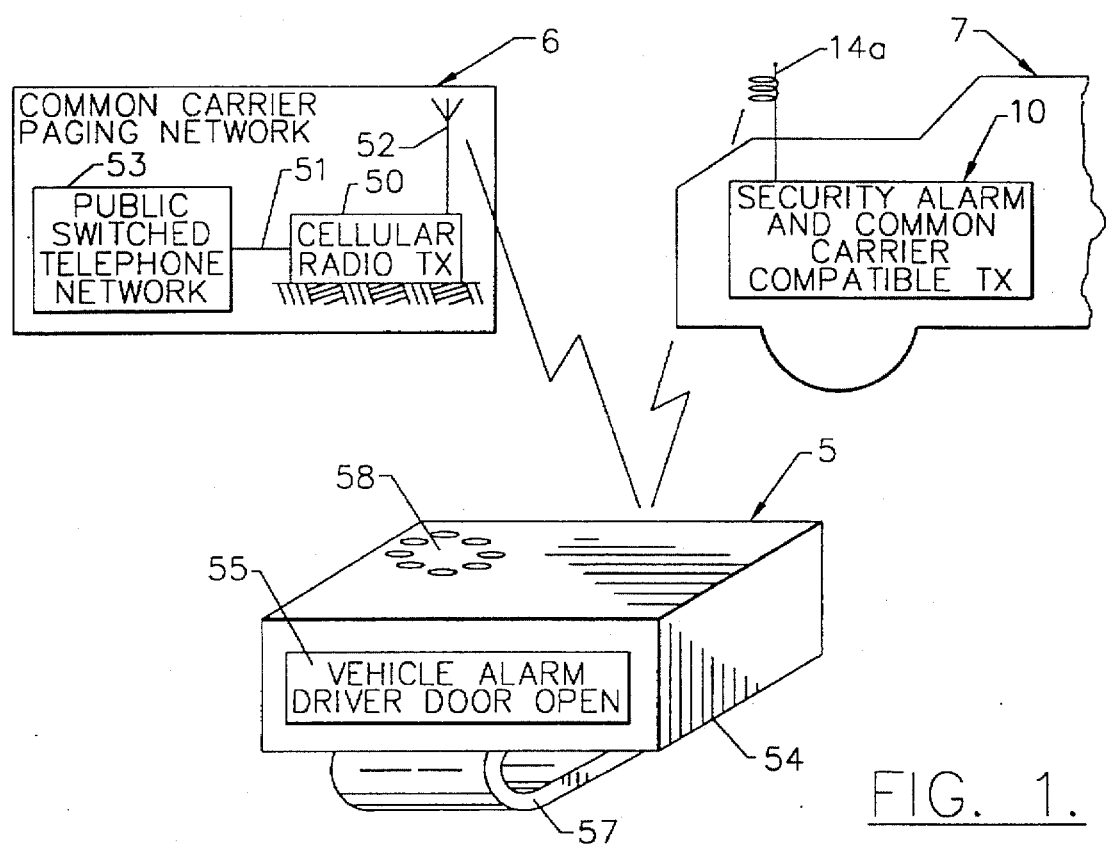
FIG. 1 is a schematic diagram of the vehicle security system and method in accordance with the present invention.

Turning first to FIG. 1, the system and method of using a common carrier pager 5 carried by a vehicle user to alert the user of a breach of security of a vehicle 7 is first described. The common carrier pager 5 is capable of receiving common carrier paging signals from a common carrier paging network 6 as illustrated.

As would be readily understood by those skilled in the art, a conventional common carrier paging network 6 may include one or more cellular radio stations or transmitters 50 and associated antennas 52 arranged to provide a grid of zones or cells of coverage. As disclosed in Electronics Engineers' Handbook, Chapter 22, pp. 19–20, (1989), paging typically provides for one-way signalling to small receivers or pagers carried by individuals. A specific pattern of channel use is assigned within a group of adjacent cells so that the channels can be reused within a system in a controlled way to reduce interference. A paging call is typically routed from the Public Switched Telephone Network (PSTN) 53 via a land-line 51 to the cellular transmitter 50 in the vicinity of the pager 5. Low power radio frequency transmission is typically only used for the last few miles of the communications link.

Paging systems in urban areas may require several transmitters per system. This in turn may lead to a requirement for precise carrier frequencies, audio delay equalization to prevent partial cancellation, and modulation calibration accuracy. Sequencing of transmitters can sometimes reduce the need for this requirement. Systems using a variety of signaling plans for paging are available. Schemes using tones are typically decimal plans; three to five digits are transmitted per page, yielding capacities of $10^3$ to $10^5$ users per channel and up to five pages per second as would be understood by those skilled in the art. Digital schemes typically use binary FSK signalling and error-correcting codes, which permit $10^5$ users per system and five pages per second. As would also be readily understood by those skilled in the art, the trend in common carrier paging is to permit more information to be sent or stored. In addition, satellites may play an increasing part in establishing all or a part of the communications link either to cellular radio cell sites or directly to the common carrier pagers.

Figure 2:
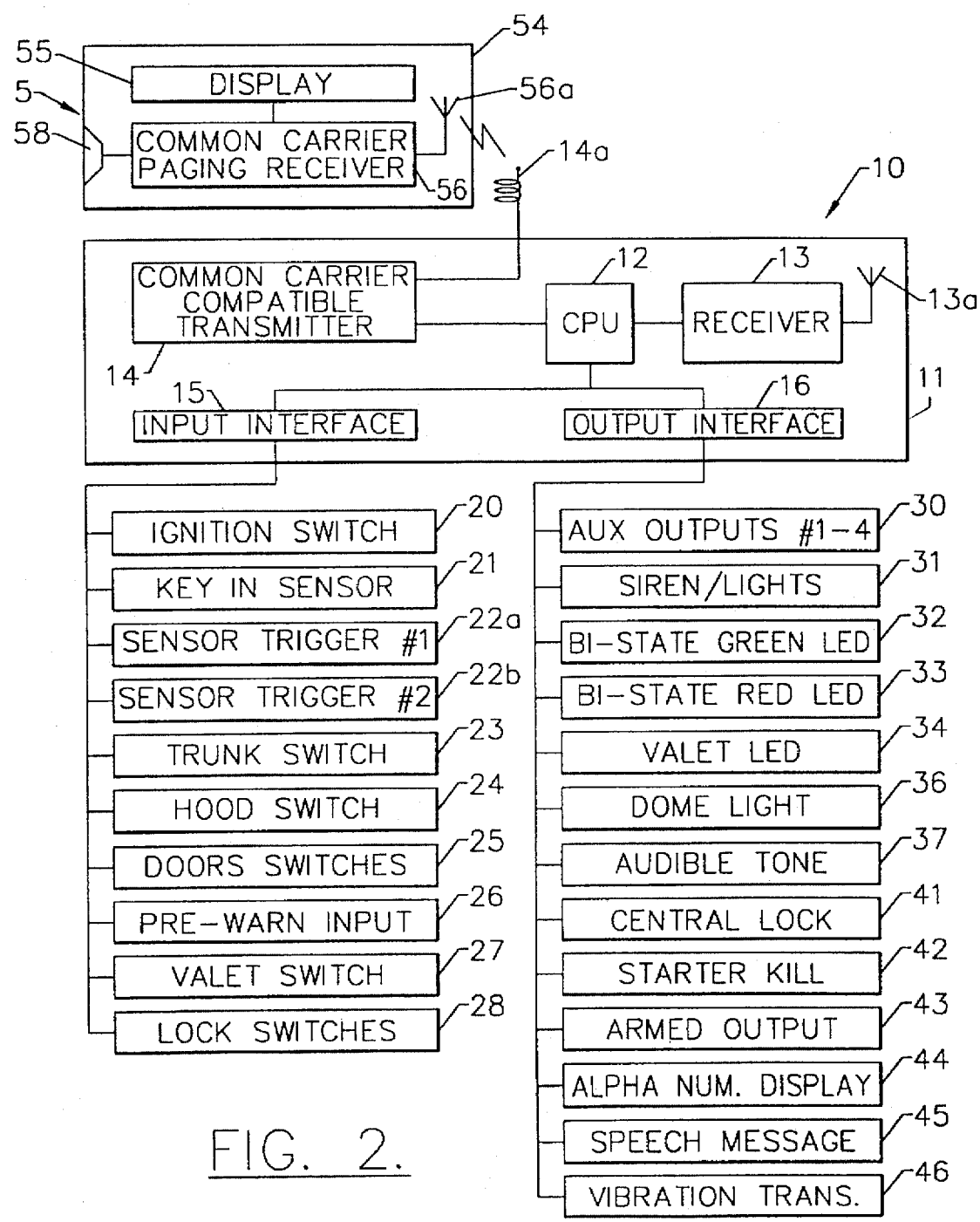
FIG. 2 is a more detailed schematic block diagram of the vehicle security system and method in accordance with the invention.

Turning now additionally to FIG. 2, the security system 10 is further described. The security system 10 includes a controller 11 which, in turn, in the illustrated embodiment, includes a central processing unit or microprocessor 12 operating under stored program control. In the illustrated embodiment, a receiver 13 and its antenna 13a are connected to the microprocessor 12 for receiving signals from a remote transmitter, not shown, which may be used to remotely arm and disarm the system, for example. The microprocessor may also be operatively connected to an input interface 15 and an output interface 16. As would be readily understood by those skilled in the art, the microprocessor 12 may be connected to an external memory or alternately or additionally have its own on-board memory.

The input interface 15 is illustratively connected to various vehicle input devices including: an ignition switch 20; a key in the ignition sensor 21; two zone sensors 22a, 22b; conventional trunk hood and door pin sensors or switches 23, 24, and 25, respectively; and door lock switches 28. In addition, a pre-warn sensor 26 and valet switch 27 also provide inputs to the controller 11 in the illustrated embodiment. As would be readily understood by those skilled in the art, other inputs are also contemplated by the present invention and are generally described herein by the term sensor.

The output interface 16 of the controller 11 may preferably be connected to a plurality of output devices. The outputs may include auxiliary relay outputs 30, such as for window control, remote starting, or a remote alarm indication, as would be readily understood by those skilled in the art. A siren and/or lights 31, and green and red light emitting diodes (LEDs) 32, 33 for dashboard mounting are also illustratively connected to the controller 11. Other outputs may be directed to a valet LED 34, a dome light 36, a central lock relay or lock control unit 41, a starter kill circuit 42, and an armed relay output 43. In addition, other outputs may be directed to one or more of an audible tone generator 37, an alphanumeric display 44, a speech message annunciator 45, and a vibration transducer 46, as will be readily appreciated by those skilled in the art. Other similar indicating devices are also contemplated by the present invention, as would also be readily understood by those skilled in the art.

The vehicle security system 10 also includes a common carrier compatible vehicle alarm transmitter 14 connected to the illustrated antenna 14a. The transmitter 14 sends a vehicle security alarm signal compatible with common carrier paging signals in response to a vehicle security sensor sensing a breach of vehicle security. The pager 5 illustratively includes a carrying clip 57 attached to a relatively compact housing 54 which, in turn, carries an alphanumeric message display 55 and contains the common carrier paging receiver 56 and its antenna 56a. A rechargeable battery may also be contained within the housing as would be readily understood by those skilled in the art. In addition, the pager 5 may also include a microprocessor or other logic and control circuitry as would also be readily understood by those skilled in the art.

The common carrier paging receiver 56 preferably receives common carrier paging signals from the common carrier paging network 6 (FIG. 1), but may also directly receive the vehicle security alarm signal from the common carrier compatible vehicle alarm transmitter 14 without using other portions of the common carrier paging network.

The illustrated alphanumeric display 55 provides indicating means for indicating receipt of the vehicle security alarm signal to the vehicle user to thereby alert the vehicle user of a vehicle security breach. The message may also include a description of the particular sensor or security breaching event. For example, as shown with brief reference to FIG. 1, a message indicating that the driver door is open may be generated, transmitted, received and displayed in accordance with one aspect of the present invention. An audible tone or speech message may also be communicated to the user via a speaker or transducer 58 as would be readily understood by those skilled in the art. Other techniques for providing an indication to the user via the pager 5 are also contemplated by the present invention.

The common carrier paging receiver 56 may comprise code receive means for activating the indicating means responsive to receipt of the pager's unique identification code. Those of skill in the art will readily appreciate that each pager may be assigned a particular identification code or number. The common carrier compatible alarm transmitter 14 preferably comprises code transmit means for transmitting the vehicle security alarm signal including the pager identification code. In addition, the common carrier compatible transmitter 14 also preferably includes means for permitting the user to select the code, such as by learning or programming of the code of the user's pager 5.

The common carrier compatible vehicle alarm transmitter 14 directly sends a vehicle alarm signal to the conventional pager 5 as may typically be provided for sale or lease by a common carrier and which typically operates in allocated channels in the upper ends of the UHF band to the microwave frequency band as would be readily understood by those skilled in the art. For example, the pager 5 may be a standard BRAVO model pager as offered by Motorola, Inc. Other conventional common carrier pagers may also be readily used. The common carrier transmitter 14 also operates on the common carrier frequency or frequencies of the pager 5 and provides the vehicle alarm signal in the format compatible with the conventional pager. The alarm transmitter 14 may also include means for learning or permitting user programming of the particular common carrier paging signal format and/or frequency, for example, for a desired pager from among a plurality of pagers of different manufacturers, for example. Error correction schemes and other parameters may also be selectable by the user for compatibility with the common carrier paging network with which the pager is being used.

In addition, the transmitter 14 preferably comprises power setting means for transmitting the vehicle security alarm signal at a relatively low power so as reduce a likelihood of interference with other nearby portions of the common carrier paging network 6 and while being sufficient to cooperate with the common carrier pager 5 to provide the indication of a breach of vehicle security to the user. Those of skill in the art will readily recognize that a power setting producing up to about one mile or so of coverage may be desired, since there is little the vehicle owner can do if further away from the vehicle. The power setting means may also be configured or adjusted for terrain, structures or buildings likely to be encountered.

Figure 3:
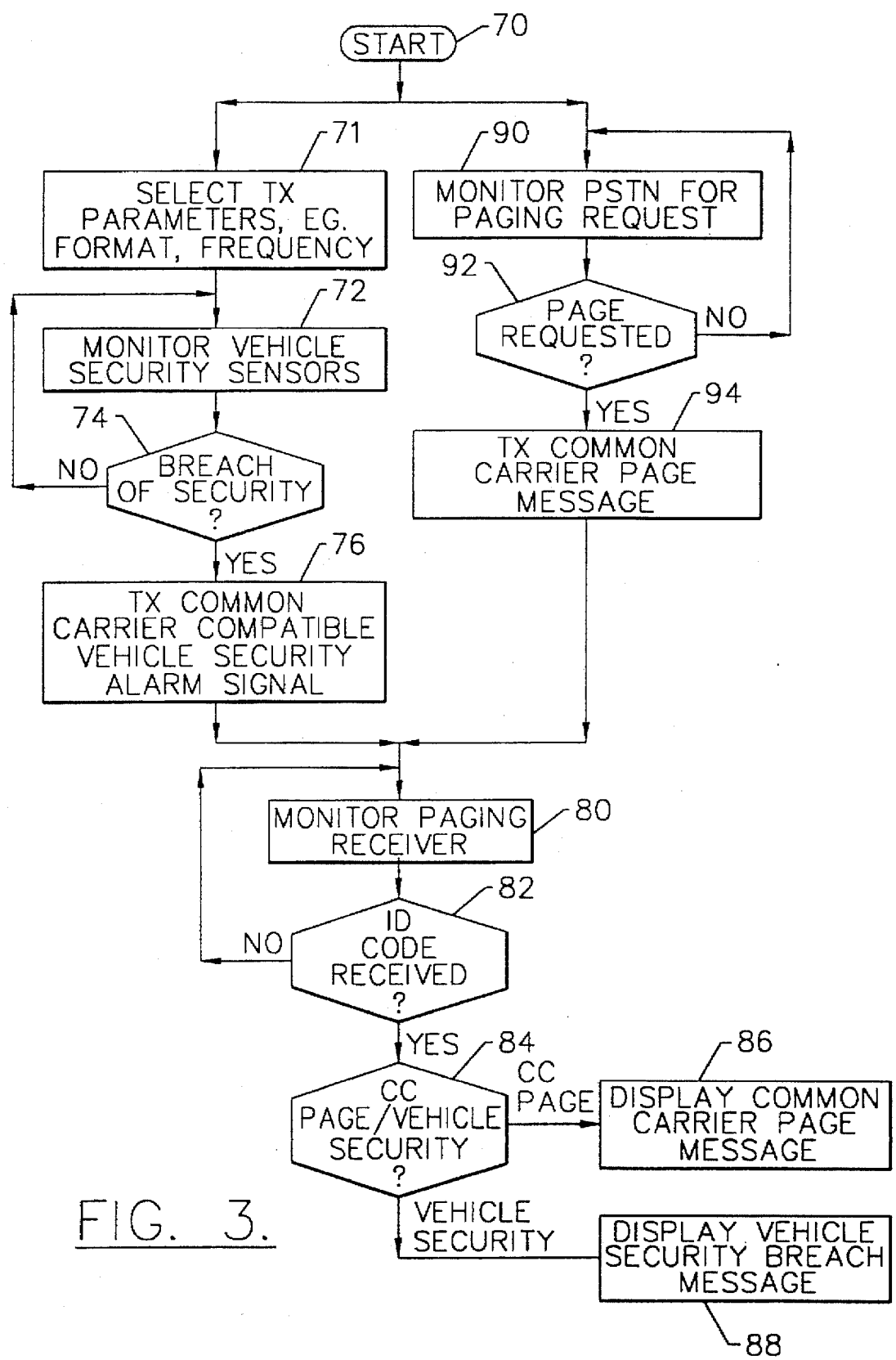
FIG. 3 is a flow chart illustrating the method according to the present invention.

Referring now additionally to the flow chart of FIG. 3, the method of the present invention is further described. From the start (Block 70), the vehicle user or owner may set the transmitter 14 operating parameters, such as frequency, format by manufacturer, power level, etc. as illustrated in Block 71. The vehicle controller 11 monitors the vehicle security sensors at Block 72. If a breach of security is determined at Block 74, the vehicle security alarm signal is transmitted by the transmitter 14 in a common carrier compatible paging format. As described above and as would be readily understood by those skilled in the art, a unique identification code is included in the transmitted alarm signal so that only the desired pager 5 of the user is activated.

Similarly, the PSTN may be monitored for an incoming paging request at Block 90. If a page is requested at Block 92, the common carrier paging network 6 will generate and transmit the common carrier page message at Block 94.

At Block 80 the remote paging receiver 56 is monitored for receipt of a signal on the assigned frequency channel. At Block 82 it is determined whether the pager's unique identification code is received. If the correct code is received, the pager 5 may determine and display the common carrier paging message at Block 86, or the vehicle security breach message (Block 88).

Many conventional pagers 5 may store several messages until read and deleted by the user. Accordingly, the security system 10 and related method may be readily implemented without adversely affecting the ability of the user to receive conventional PSTN paging signals and messages. Moreover, since the common carrier compatible alarm signal is transmitted and received directly by the pager 5 without passing through intervening common carrier facilities, the alarm message is likely to be quickly received by the user.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A method of using a common carrier pager carried by a vehicle user to alert the user of a vehicle security breach, the common carrier pager including a common carrier paging receiver being capable of receiving common carrier paging signals from a common carrier paging network, the method comprising the steps of:

providing a vehicle alarm transmitter at the vehicle for transmitting a vehicle security alarm signal compatible with common carrier paging signals;

sensing for a breach of vehicle security using at least one vehicle security sensor;

transmitting the vehicle security alarm signal from the vehicle alarm transmitter responsive to a sensed breach of vehicle security;

directly receiving the vehicle security alarm signal at the common carrier paging receiver from the vehicle alarm transmitter without using other portions of the common carrier paging network; and indicating a vehicle security breach to the vehicle user via the common carrier paging receiver responsive to receipt of the vehicle security alarm signal;

whereby the vehicle user can receive both common carrier paging signals and the vehicle security alarm signal using the common carrier paging receiver.

2. A method according to claim 1 wherein the common carrier paging receiver is responsive to a pager identification code; and wherein the step of transmitting the vehicle security alarm signal comprises transmitting same and including the pager identification code.

3. A method according to claim 1 wherein the common carrier paging receiver is responsive to a signal having a predetermined format from among a plurality of formats; and wherein the step of transmitting the vehicle security alarm signal comprises transmitting same in the predetermined format of the common carrier paging receiver.

4. A method according to claim 1 wherein the step of transmitting the vehicle security alarm signal comprises transmitting same at a relatively low power so as reduce a likelihood of interference with other nearby portions of the common carrier paging network while being sufficient to cooperate with the common carrier paging receiver to alert the vehicle user of a security breach.

5. A method according to claim 1 wherein the common carrier paging receiver operates at a predetermined frequency; and wherein the step of transmitting the vehicle security alarm signal comprises transmitting same at the predetermined frequency of the common carrier paging receiver.

6. A method according to claim 1 wherein the step of transmitting the vehicle security alarm signal comprises transmitting same to generate a message at the common carrier paging receiver of a breach of vehicle security.

7. A method according to claim 1 wherein the step of transmitting the vehicle security alarm signal comprises transmitting same to generate an alphanumeric message at the common carrier paging receiver of a breach of vehicle security.

8. A method according to claim 1 wherein the step of sensing comprises sensing at least one of door position, motion within the vehicle, and motion adjacent the vehicle.

9. A method of using a common carrier paging receiver carried by a vehicle user to alert the user of a vehicle security breach, the common carrier pager including a common carrier paging receiver being capable of receiving common carrier paging signals from a common carrier paging network, the method comprising the steps of:

providing a vehicle alarm transmitter at the vehicle for transmitting a vehicle security alarm signal compatible with common carrier paging signals;

sensing for a breach of vehicle security using at least one vehicle security sensor;

transmitting the vehicle security alarm signal from the vehicle alarm transmitter responsive to a sensed breach of vehicle security, the transmitting being at a predetermined frequency and power level compatible with the common carrier paging receiver;

directly receiving the vehicle security alarm signal at the common carrier paging receiver from the vehicle alarm transmitter without using other portions of the common carrier paging network; and indicating a vehicle security breach to the vehicle user via the common carrier paging receiver responsive to receipt of the vehicle security alarm signal.

10. A method according to claim 9 wherein the common carrier paging receiver is responsive to a pager identification code; and wherein the step of transmitting the vehicle security alarm signal comprises transmitting same and including the pager identification code.

11. A method according to claim 9 wherein the common carrier paging receiver is responsive to a signal having a predetermined format from among a plurality of formats; and wherein the step of transmitting the vehicle security alarm signal comprises transmitting same in the predetermined format of the common carrier paging receiver.

12. A method according to claim 9 wherein the step of transmitting the vehicle security alarm signal comprises transmitting same to generate a message at the common carrier paging receiver of a breach of vehicle security.

13. A method according to claim 9 wherein the step of transmitting the vehicle security alarm signal comprises transmitting same to generate an alphanumeric message at the common carrier paging receiver of a breach of vehicle security.

14. A method according to claim 9 wherein the step of sensing comprises sensing at least one of door position, motion within the vehicle, and motion adjacent the vehicle.

15. A method of using a common carrier pager carried by a vehicle user to alert the user of a vehicle security breach, the common carrier pager including a common carrier paging receiver being capable of receiving common carrier paging signals from a common carrier paging network, the method comprising the steps of:

providing a vehicle alarm transmitter at the vehicle for transmitting a vehicle security alarm signal compatible with common carrier paging signals;

transmitting the vehicle security alarm signal from the vehicle alarm transmitter responsive to a sensed breach of vehicle security; and directly receiving the vehicle security alarm signal at the common carrier paging receiver from the vehicle alarm transmitter without using other portions of the common carrier paging network and indicating receipt of the vehicle security alarm signal to the user.

16. A method according to claim 15 wherein the common carrier paging receiver is responsive to a pager identification code; and wherein the step of transmitting the vehicle security alarm signal comprises transmitting same and including the pager identification code.

17. A method according to claim 15 wherein the common carrier paging receiver is responsive to a signal having a predetermined format from among a plurality of formats; and wherein the step of transmitting the vehicle security alarm signal comprises transmitting same in the predetermined format of the common carrier paging receiver.

18. A method according to claim 15 wherein the step of transmitting the vehicle security alarm signal comprises transmitting same at a relatively low power so as reduce a likelihood of interference with other nearby portions of the common carrier paging network while being sufficient to cooperate with the common carrier paging receiver to alert the vehicle user of a security breach.

19. A method according to claim 15 wherein the common carrier paging receiver operates at a predetermined frequency; and wherein the step of transmitting the vehicle security alarm signal comprises transmitting same at the predetermined frequency of the common carrier paging receiver.

20. A method according to claim 15 wherein the step of transmitting the vehicle security alarm signal comprises transmitting same to generate a message at the common carrier paging receiver of a breach of vehicle security.

21. A method according to claim 15 wherein the step of transmitting the vehicle security alarm signal comprises transmitting same to generate an alphanumeric message at the common carrier paging receiver of a breach of vehicle security.

22. A method according to claim 15 wherein the step of transmitting the vehicle security alarm signal comprises sensing for a breach of vehicle security using at least one vehicle security sensor; and wherein the step of sensing comprises sensing at least one of door position, motion within the vehicle, and motion adjacent the vehicle.

23. An apparatus for alerting a vehicle user of a vehicle security breach, the apparatus comprising:
at least one vehicle security sensor for sensing a breach of vehicle security;
a vehicle alarm transmitter at the vehicle for transmitting a vehicle security alarm signal compatible with common carrier paging signals responsive to a sensed breach of vehicle security; and
a common carrier pager for being carried by the vehicle user when away from the vehicle, said common carrier pager comprising
receiver means for receiving common carrier paging signals from a common carrier paging network and for directly receiving the vehicle security alarm signal from the vehicle alarm transmitter without using other portions of the common carrier paging network, and
indicating means for indicating receipt of the vehicle security alarm signal to the vehicle user to thereby alert the vehicle user of a vehicle security breach.

24. An apparatus according to claim 23 wherein said common carrier pager comprises code receive means for activating said indicating means responsive to receipt of a pager identification code; and wherein said vehicle alarm transmitter comprises code transmit means for transmitting the vehicle security alarm signal including the pager identification code.

25. An apparatus according to claim 24 wherein said vehicle alarm transmitter further comprises code selecting means for enabling the vehicle user to input a pager identification code.

26. An apparatus according to claim 23 wherein said receiver means comprises format receiver means for being responsive to a signal having a predetermined format from among a plurality of formats; and wherein said vehicle alarm transmitter comprises format transmitting means for transmitting the vehicle security alarm signal in the predetermined format of said receiver means.

27. An apparatus according to claim 26 wherein said vehicle alarm transmitter further comprises format selecting means for enabling the vehicle user to select a signal format from among a plurality of formats.

28. An apparatus according to claim 23 wherein said vehicle alarm transmitter comprises power setting means for enabling the user to set a relatively low transmitting power for the vehicle security alarm signal so as reduce a likelihood of interference with other nearby portions of the common carrier paging network and while being sufficient to cooperate with the common carrier pager.

29. An apparatus according to claim 23 wherein said receiver means comprises means for operating at a predetermined frequency; and wherein said vehicle alarm transmitter comprises frequency setting means for enabling the user to set said vehicle alarm transmitter means to operate at the predetermined frequency of the receiver means.

30. An apparatus according to claim 23 wherein said vehicle alarm transmitter comprises message means for transmitting the alarm vehicle security signal including a portion for causing the indicating means of said common carrier pager to indicate a message related to a vehicle security breach.

31. An apparatus according to claim 23 wherein said vehicle alarm transmitter comprises alphanumeric message means for transmitting the alarm vehicle security signal including a portion for causing the indicating means of said common carrier pager to indicate an alphanumeric message related to a vehicle security breach.

32. An apparatus according to claim 23 wherein said at least one vehicle security sensor comprises at least one of a door position sensor, a motion sensor, and a proximity sensor.

33. An apparatus for alerting a vehicle user of a vehicle security breach, the apparatus comprising:
at least one vehicle security sensor for sensing a breach of vehicle security;
a vehicle alarm transmitter at the vehicle for transmitting a vehicle security alarm signal compatible with common carrier paging signals responsive to a sensed breach of vehicle security, said vehicle alarm transmitter comprises code transmit means for transmitting the vehicle security alarm signal including a pager identification code; and
a common carrier pager for being carried by the vehicle user when away from the vehicle, said common carrier pager comprising
receiver means for receiving common carrier paging signals from a common carrier paging network and for directly receiving the vehicle security alarm signal from the vehicle alarm transmitter without using other portions of the common carrier paging network,
indicating means for indicating receipt of the vehicle security alarm signal to the vehicle user to thereby alert the vehicle user of a vehicle security breach, and
code receive means for activating said indicating means responsive to receipt of the pager identification code.

34. An apparatus according to claim 33 wherein said vehicle alarm transmitter further comprises code setting means for enabling the vehicle user to input the pager identification code.

35. An apparatus according to claim 33 wherein said receiver means comprises format receiver means for being responsive to a signal having a predetermined format from among a plurality of formats; and wherein said vehicle alarm transmitter comprises format transmitting means for transmitting the vehicle security alarm signal in the predetermined format of said receiver means.

36. An apparatus according to claim 35 wherein said vehicle alarm transmitter further comprises format selecting means for enabling the vehicle user to select a signal format from among a plurality of formats.

37. An apparatus according to claim 33 wherein said vehicle alarm transmitter comprises power setting means for enabling the user to select a relatively low transmit power for the vehicle security alarm signal so as reduce a likelihood of interference with other nearby portions of the common carrier paging network and while being sufficient to cooperate with the common carrier pager.

38. An apparatus according to claim 33 wherein said receiver means comprises means for operating at a predetermined frequency; and wherein said vehicle alarm transmitter comprises frequency selecting means for enabling the user to set the vehicle alarm transmitter to operate at the predetermined frequency of the receiver means.

39. An apparatus according to claim 33 wherein said vehicle alarm transmitter comprises message means for transmitting the alarm vehicle security signal including a portion for causing the indicating means of said common carrier pager to indicate a message related to a vehicle security breach.

40. An apparatus according to claim 33 wherein said vehicle alarm transmitter comprises alphanumeric message means for transmitting the alarm vehicle security signal including a portion for causing the indicating means of said common carrier pager to indicate an alphanumeric message related to a vehicle security breach.

41. An apparatus according to claim 33 wherein said at least one vehicle security sensor comprises at least one of a door position sensor, a motion sensor, and a proximity sensor.

* * * * *